US011952126B2

(12) United States Patent
Parker et al.

(10) Patent No.: US 11,952,126 B2
(45) Date of Patent: Apr. 9, 2024

(54) CRADLING PASSENGER SEAT ASSEMBLY

(71) Applicant: Safran Seats USA LLC, Gainesville, TX (US)

(72) Inventors: Ty Parker, Sanger, TX (US); Christopher D. Stewart, Saint Jo, TX (US)

(73) Assignee: Safran Seats USA LLC, Gainesville, TX (US)

( * ) Notice: Subject to any disclaimer, the term of this patent is extended or adjusted under 35 U.S.C. 154(b) by 65 days.

(21) Appl. No.: 17/623,338

(22) PCT Filed: Jul. 31, 2019

(86) PCT No.: PCT/US2019/044373
§ 371 (c)(1),
(2) Date: Dec. 28, 2021

(87) PCT Pub. No.: WO2021/021162
PCT Pub. Date: Feb. 4, 2021

(65) Prior Publication Data
US 2022/0411069 A1   Dec. 29, 2022

(51) Int. Cl.
*B64D 11/06* (2006.01)
*B60N 2/12* (2006.01)

(52) U.S. Cl.
CPC ........ *B64D 11/064* (2014.12); *B64D 11/0648* (2014.12); *B60N 2/12* (2013.01)

(58) Field of Classification Search
CPC ...... B64D 11/064; B60N 2/12; B60N 2/1828; B60N 2/1832; B60N 2/42763;

(Continued)

(56) References Cited

U.S. PATENT DOCUMENTS

| 5,437,494 A | 8/1995 | Beauvais |
| 6,334,648 B1 * | 1/2002 | Girsberger ......... B60N 2/42736 |
| | | 297/216.19 |

(Continued)

FOREIGN PATENT DOCUMENTS

| DE | 202018106994 U1 * | 1/2019 | ......... A47C 1/03294 |
| EP | 3167762 A1 * | 5/2017 | ........... A47C 1/0352 |

OTHER PUBLICATIONS

International Patent Application No. PCT/US2019/044373, International Search Report and Written Opinion, dated May 8, 2020.

(Continued)

*Primary Examiner* — Timothy J Brindley
(74) *Attorney, Agent, or Firm* — Kilpatrick Townsend & Stockton LLP

(57) ABSTRACT

Described are passenger seats having a seat frame and a seat bottom slidingly and pivotally attached to the seat frame that, when the passenger seats are reclined, are configured to articulate forward from an upright configuration of the passenger seat to a second seat position corresponding to a reclined configuration of the passenger seat. The seat bottom can include an aft articulating mechanism that defines a declining first path in an aft-to-forward direction to cause the aft end of the seat bottom to drop when the seat bottom articulates forward; and a forward articulating mechanism connected with the seat bottom near a forward end of the seat bottom that defines a second path shaped to cause the forward end of the seat bottom to move upward when the seat bottom articulates forward, such that the seat bottom tilts aft in response to articulating forward when the passenger seat is reclined.

18 Claims, 8 Drawing Sheets

(58) Field of Classification Search
CPC ............ B60N 2/42718; A47C 1/03294; A47C 1/0345; A47C 1/0352
See application file for complete search history.

(56) References Cited

U.S. PATENT DOCUMENTS

| | | | |
|---|---|---|---|
| 7,052,088 B2* | 5/2006 | Aramburu Echeverria ................ A47C 1/025 297/316 |
| 8,733,840 B2* | 5/2014 | Westerink ............ B64D 11/064 297/316 |
| 11,148,811 B1* | 10/2021 | Eisele ................. B64D 11/0619 |
| 11,577,838 B2* | 2/2023 | Reichel .............. B64D 11/0648 |
| 2003/0025371 A1* | 2/2003 | Veneruso ......... B64D 11/06395 297/322 |
| 2004/0036336 A1* | 2/2004 | Veneruso ................. B60N 2/34 297/184.14 |
| 2005/0242634 A1 | 11/2005 | Serber |
| 2012/0104819 A1* | 5/2012 | Line .................... B60N 2/1828 297/344.1 |
| 2014/0084647 A1* | 3/2014 | Darbyshire ........ B64D 11/0643 297/217.1 |
| 2014/0300161 A1* | 10/2014 | Beroth ................... B64D 11/06 297/340 |
| 2017/0313213 A1* | 11/2017 | Meister .............. B64D 11/0642 |
| 2022/0332422 A1* | 10/2022 | Parker ................. B64D 11/064 |

OTHER PUBLICATIONS

Europe Patent Application No. 19752406.9, Office Action, dated Sep. 5, 2023, 7 pages.

\* cited by examiner

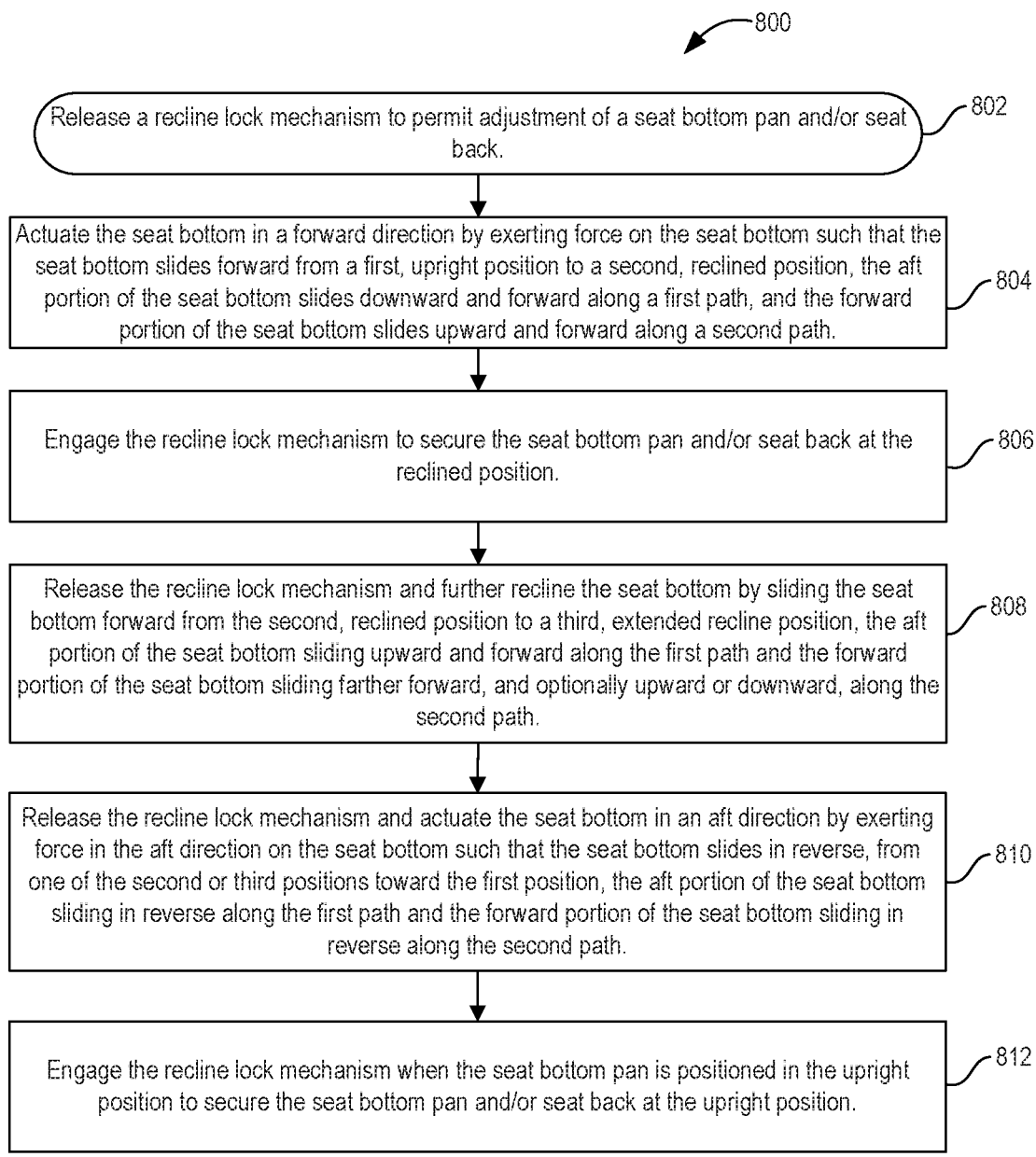

CRADLING PASSENGER SEAT ASSEMBLY

FIELD OF THE INVENTION

The field of the disclosure relates to passenger seat adjustment mechanisms.

BACKGROUND

Safety, comfort, and weight are among the driving concerns for passenger amenities, particularly in the context of aircraft furnishings. For example, amenities should protect the passenger against injury during an impact event, should be comfortable and adjustable, and should meet ergonomic requirements for passengers on long flights. For very long flights, space constraints can make passenger comfort a particular challenge. The recline mechanism in conventional passenger seats is an expected ergonomic feature, and recent advances in articulating seat-bottom assemblies allow passengers more freedom and the perception of more space. However, existing adjustment mechanisms are constrained by requirements for strength, weight, and the existing seat frame structures. To that end, novel approaches to passenger comfort are needed.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat can include a seat frame with an articulating seat bottom. The seat bottom can be slidingly and pivotally attached to the seat frame, and configured to articulate forward from a first seat position corresponding to an upright configuration of the passenger seat to a second seat position corresponding to a reclined configuration of the passenger seat when the passenger seat is reclined by a user. An aft articulating mechanism connected with the seat bottom near an aft end of the seat bottom and connected with seat frame can define a first path that declines in an aft-to-forward direction to cause the aft end of the seat bottom to drop by a first distance when the seat bottom articulates forward. Similarly, a forward articulating mechanism connected with the seat bottom near a forward end of the seat bottom and connected with the seat frame can define a second path shaped to cause the forward end of the seat bottom to move upward by a second distance when the seat bottom articulates forward, the second distance being different from the first distance. The combined movement of the seat bottom pan at the aft and forward articulating mechanism causes the seat bottom to tilt aft in a cradling motion in response to articulating forward when the passenger seat is reclined.

According to various embodiments of the present invention, an articulating seat bottom assembly for a passenger seat can be provided for connecting with a passenger seat and able to provide for a cradling recline motion when the seat is reclined by a passenger. Embodiments of an articulating seat bottom assembly can include a seat bottom, and aft articulating mechanism connectible between the seat bottom and a seat frame, and a forward articulating mechanism connectible between the seat bottom and seat frame. The aft articulating mechanism can be configured to attach to a passenger seat frame and can define a first path that declines in an aft-to-forward direction such that, when attached to the seat bottom and the passenger seat frame, the aft articulating mechanism is shaped to constrain motion of the aft end of the seat bottom with respect to the passenger seat frame such that the aft end of the seat bottom moves down by a first distance when the seat bottom is pushed forward from a first seat position to a second seat position. The forward articulating mechanism connected can be configured to attach to a passenger seat frame, and to define a second path shaped to cause the forward end of the seat bottom to move upward by a second distance when the seat bottom articulates forward, the second distance being different from the first distance, such that the seat bottom tilts aft in response to articulating forward when the seat bottom is connected with the passenger seat and the passenger seat is reclined.

Various embodiments of the articulating seat bottom assemblies and passenger seats as disclosed herein can include additional features and provide additional articulating movements of the seat bottom assembly and other portions of the passenger seats, such as passenger seat backs. For example, according to some embodiments, an articulating passenger seat bottom assembly can be connected with a seat back by a mechanical linkage such that, when the seat bottom assembly articulates forward, a lower portion of the passenger seat back is drawn forward causing the seat to recline. According to some other embodiments, an articulating passenger seat bottom assembly and associate forward and aft articulating mechanisms can have an extended range of motion beyond the upright and reclined configurations. In some embodiments, an extended range of motion can include an install configuration, where the seat bottom assembly slides aft of a fully upright configuration, in order to clear space for connection of under-seat components such as a recline lock mechanism. In some other embodiments, an extended range of motion can include an extended or extreme recline, whereby the direction of tilt of the passenger seat bottom can reverse as the passenger seat bottom extends forward and the seat back extends aft.

According to various embodiments of the present invention, a passenger seat bottom angle can be adjusted in a manner that includes a cradle-like tilt to the seat bottom while the seat bottom extends forward during a recline action. Suitable methods include, with any suitable passenger seat assembly as described above, actuating a release mechanism while a seat bottom assembly is in a first, upright position, to free the seat bottom assembly to slide forward or aft, and actuating the seat bottom by exerting force in a forward direction such that the seat bottom moves forward while an aft portion of the seat bottom moves downward and forward along a first path, and a forward portion of the seat bottom moves upward and forward along a second path. The release mechanism can be disengaged to lock the seat bottom in a second position which is reclined with respect to the first position and includes an aft tilt of the seat bottom. The recline motion can be reversed after re-engaging the release mechanism, or can be extended, in accordance with various embodiments discussed herein.

BRIEF DESCRIPTION OF THE DRAWINGS

FIG. 8 illustrates an example process for reclining or reverting an articulating passenger seat illustrated according to any of FIGS. 1-6.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide for articulating seat bottom assemblies for passenger seats. While the articulating seat bottom assemblies are discussed for use with aircraft seats, they are by no means so limited. Rather, embodiments of the articulating seat bottom assemblies may be used in passenger seats or other seats of any type or otherwise as desired.

Figure 1:
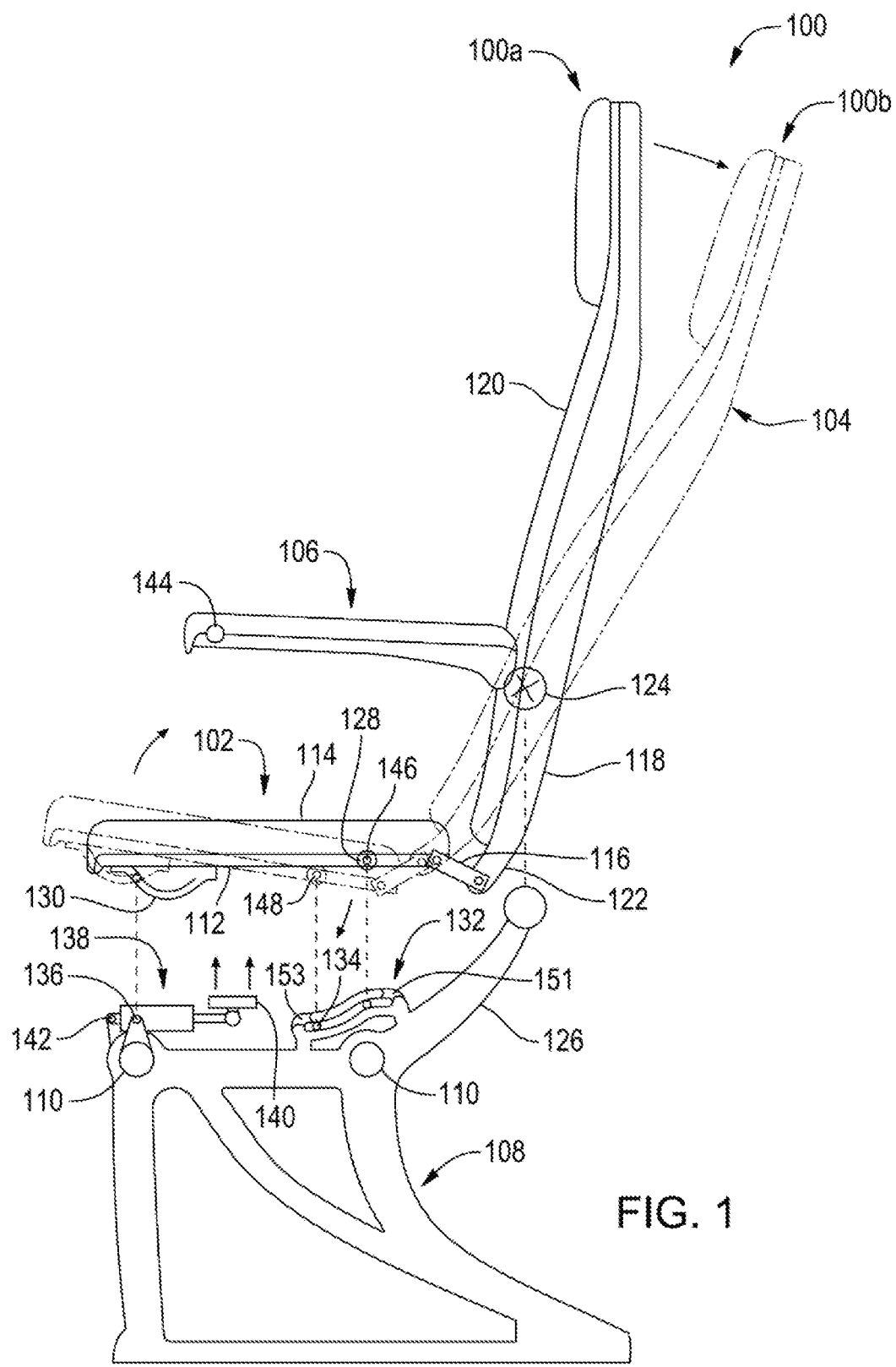
FIG. 1 is a simplified side view schematic of an example of a passenger seat assembly having an articulating seat bottom and seat back, in accordance with various embodiments of the present disclosure.

According to certain embodiments of the present invention, as shown in FIG. 1, a passenger seat 100 includes a frame 108, a seat back 104, an armrest assembly 106, and an articulating seat bottom assembly 102. The articulating seat bottom assembly 102 and seat back 104 can pivot between an upright position 100a and a recline position 100b in which both the seat bottom assembly and seat back tilt aft, and in which the seat bottom assembly shifts forward in a cradling motion that maintains support for a passenger seated thereon. This form of movement, whereby the articulating seat bottom tilts as it moves forward, contrasts with conventional seating assemblies, in which reclining the seat back causes a change in posture of the passenger that encourages the passenger to slide forward on the seat bottom.

In some embodiments, the articulating seat bottom assembly 102 and seat back 104 are linked, e.g. by connecting linkage 116 attached at a lower end 122 of the seat back (i.e., the portion of the seat back below the pivot point 124), so that motion of either component results in motion of both components together. Force exerted on the seat bottom assembly 102 will then cause the seat bottom to move forward or aft along with the lower end 122 of the seat back 104, causing the seat back to pivot around a pivot point 124 and to recline in tandem with forward motion of the seat bottom assembly, or to move upright in tandem with aft motion of the seat bottom assembly. In alternative embodiments, the articulating seat bottom assembly 102 can be decoupled from the seat back 104, allowing them to actuate independently.

The articulating seat bottom assembly 102 is connected with the frame 108 of the seat assembly 100 by way of a forward articulating mechanism 130 and an aft articulating mechanism 132, which work in tandem to constrain the motion of the articulating seat bottom assembly. In some embodiments, the seat bottom assembly 102 is connected with structural tubes 110 that run along an arrangement of seating assemblies.

Structural components of the seat assembly 100, including the frame 108, seat bottom assembly 102, seat back 104, and other components, may be formed of materials including but not limited to aluminum, stainless steel, aramid fibers, polycarbonate, polypropylene, other metallic materials, composite materials, or other similar materials, except where expressly stated otherwise.

The seat bottom assembly 102 includes a seat bottom pan 112, which forms the structural basis of the seat bottom and connects to the various mechanical connectors described herein, and a seat bottom cushion 114 that forms a supportive surface for a passenger. The seat bottom pan 112 is described herein as a single component, but it will be understood that alternative constructions are within the scope of this disclosure, such as but not limited to: hollow frames supporting a mesh support, multi-part assemblies, shaped assemblies that omit cushioning entirely, or any other suitably supportive seat bottom structure. Where seat bottom cushion 114 is present, suitable materials can include, but are not limited to, conventional foam-filled cushions formed of a textile, membrane, or flexible polymer container; a suspended diaphragm or mesh, or any other suitable cushioning element.

The seat back 104 can likewise include a seat back structure 118, which can include any suitable frame that defines the basic shape of the seat back and supports a passenger, and a seat back cushion 120 that forms a supportive surface. The seat back 104 can also have a variety of constructions, including but not limited to a hollow mesh-covered frame, multi-part assembly, shaped assembly that omits cushioning, or other suitably supportive seat back structure. The seat back 104 can attach to the frame 108 at a rearward portion of the frame, e.g. at a pivot point 124 distally located along a seat frame spreader 126, but may attach to any suitably positioned seat element.

The seat bottom assembly 102 is connected with the frame 108 at an aft end of the seat bottom assembly by the aft seat bottom articulating mechanism 132. The aft seat bottom articulating mechanism 132, in accordance with various embodiments, includes an arcuate track 134 that supports an aft bearing element 128. The arcuate track 134 can be fixedly mounted to the frame 108 proximate to or, in some embodiments, mounted to a rearmost structural tube 110. The aft bearing element 128 passes through the arcuate track 134 and connects to the seat bottom pan 112, such that the aft bearing element supports the weight of the aft portion of the seat bottom pan, and allows the seat bottom pan to move forward and aft by the aft bearing element 128 sliding therein.

The specific shape of the arcuate track 134 can vary, and the motion permitted to the aft end of the seat bottom assembly 102 is dependent on this shape. In some embodiments, the arcuate track 134 has a negative curvature (i.e., concave in the upward-facing direction) so that, when the seat bottom assembly 102 is moved forward, the aft portion of the seat bottom assembly quickly drops, in a manner suitable for maintaining a comfortable and supportive seat for a passenger. A cradling movement of the seat bottom assembly 102 can be achieved, however, when the arcuate track 134 has a linear shape, or when it has a positive curvature, in accordance with some alternative embodiments.

The aft bearing element 128 can be a roller, pin, low-friction slider, or any other suitable bearing element. In some embodiments, the positioning of the aft bearing element 128 and arcuate track 134 can be reversed, e.g., by attaching the aft bearing element 128 to the frame 108 and attaching the arcuate track 134 to the seat bottom assembly 102. In such cases, where the arcuate track 134 "rides" on the bearing element 128, the shape of the arcuate track would be inverted to achieve the same function. For articulating mechanisms according to either configuration, the exact attachment point of the aft articulating mechanism 132 to the seat bottom assembly 102 can vary, but is typically aft of the forward articulating mechanism 130, preferably within the rearmost half of the seat bottom pan 112, preferably within 12.5 cm (5") of the aft end of the seat bottom pan.

The seat bottom assembly 102 is also connected with the frame 108 at a forward end of the seat bottom pan 112 by the forward articulating mechanism 130. The forward articulating mechanism, according to certain embodiments, includes an arcuate ramp 131 which interacts with a forward bearing element 136 to support the forward end of the seat bottom assembly 102. The arcuate ramp performs a similar function to the arcuate track 134 of the aft articulating assembly 132, in that it restrains the forward end of the seat bottom pan 112 to a particular path when the seat bottom pan is moved forward or aft. In accordance with various embodiments, the arcuate ramp 131 can be convex, defining a curved path having a positive curvature. The specific shape of the arcuate ramp 131 can be turned to define a particular path for the forward end of the seat bottom assembly 102. In some embodiments, the forward end of the seat bottom assembly must rapidly rise to avoid, e.g., impinging on components connected to the frame 108, resulting in a ramp shape that is initially steep and then levels off.

The arcuate ramp 131 and bearing element 136, in conjunction, perform a function of controlling the relative height of the forward end of the seat bottom assembly 102 when the seat bottom assembly is moved forward or back, similar to the aft bearing element 128 and arcuate track 134. In some embodiments, the arcuate ramp 131 can be replaced with a track and bearing assembly as described for the aft articulating mechanism 132; and vice versa, the arcuate track 134 of the aft articulating mechanism 132 can be replaced with a ramp/bearing assembly as described herein.

According to various alternative embodiments, the arcuate track 134 and bearing element 128 of the aft articulating mechanism 132 can be replaced with any suitable mechanism for constraining movement of a bearing element along a path, including, but not limited to, a ramp/bearing surface combination (like that described with reference to the forward articulating mechanism 130), a linear slide, rotating linkage or four-bar linkage, or other suitable mechanism. Similarly, the ramp 133 and bearing element 136 of the forward articulating mechanism 130 can be replaced with any comparable, suitable mechanism for constraining movement of the forward end of the seat bottom assembly 102. Suitable mechanisms for use as the forward articulating mechanism 130 include, e.g., rack and pinion assemblies or electric actuators.

Figure 2A:
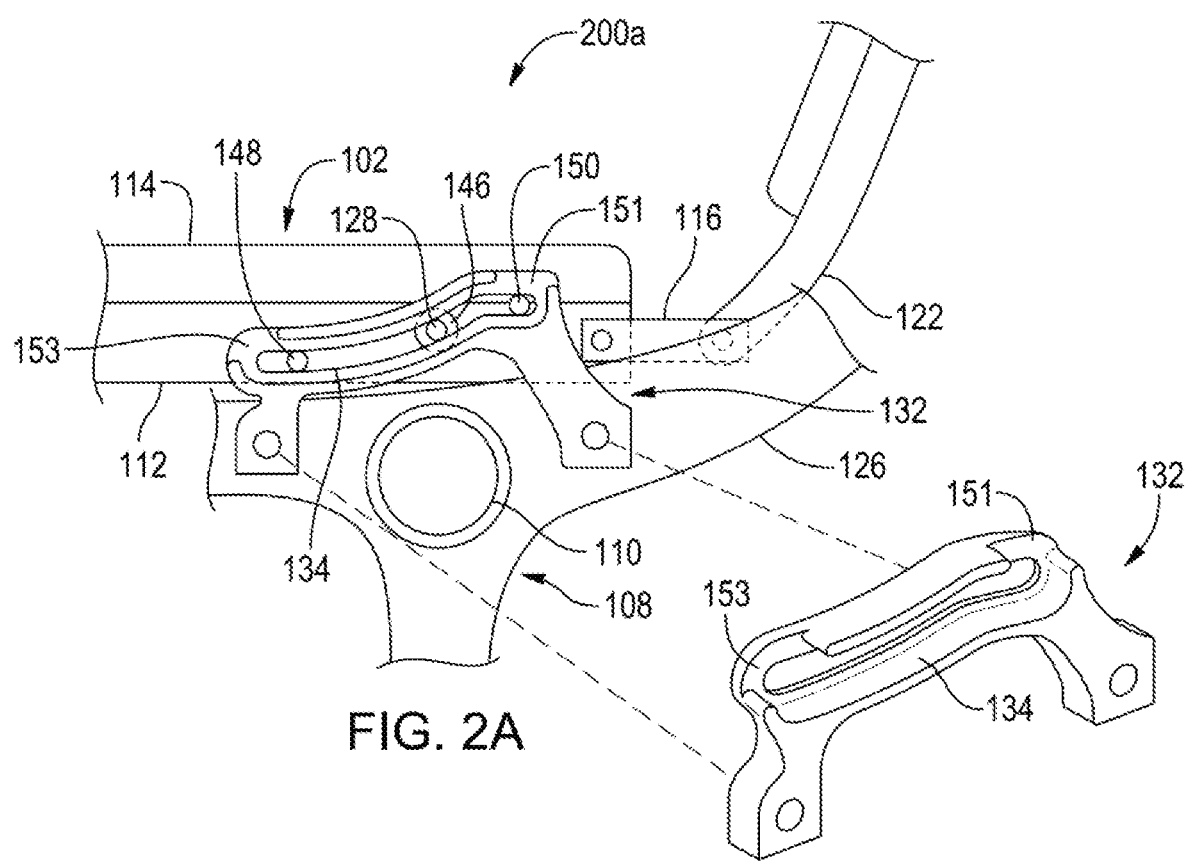
FIG. 2A and FIG. 2B are simplified side view schematics of the passenger seat of FIG. 1 with a focus on an example of an aft articulating assembly of the passenger seat.

The aft articulating mechanism 132 can include one or more openings 151, 153 that open toward the seat bottom assembly 102 and permit lift-off and removal of the aft bearing element 128 (shown in greater detail in FIG. 2A). For example, an aft opening 151 can facilitate removal of the aft bearing element when the seat bottom assembly 102 is moved fully aft with respect to the aft articulating mechanism, or a forward opening 153 that can facilitate removal of the aft bearing element when the seat bottom assembly is moved fully forward (i.e., reclined) with respect to the aft articulating mechanism. Suitable forward or aft movement for removal of the seat bottom assembly 102 may require moving the seat bottom assembly outside of a normal range of motion to which the seat bottom assembly is constrained when fully installed. For example, according to various embodiments, the seat bottom assembly 102 is constrained in forward and aft movement within a range of movement constrained by the range of a recline lock mechanism 138, which connects to the seat bottom pan 112 and to the frame 108. This range of movement excludes portions at the end(s) of the arcuate track 134 that would permit lift-off of the aft bearing element 128 through either a forward opening 151 or aft opening 153. In some embodiments, both forward and aft openings 151, 153 may be provided in order to permit multiple removal and installation options, which may be preferred depending on the configuration and location of a particular seat (e.g., as when a seat is constrained against a bulkhead, screen, or another seat that might otherwise prevent access to the forward or aft side of the seat).

The combined movement constraints defined by the paths enforced by the aft articulating mechanism 132 and the forward articulating mechanism 130 on the respective aft and forward ends of the seat bottom assembly 102 cause the seat bottom assembly to adopt a positive tilt (i.e., a tilt toward the aft direction) when the seat bottom assembly is moved forward. In some embodiments, the seat bottom assembly 130 is capable of moving forward when the seat is reclined by a distance of up to 3.75 cm (1.5"), preferably by a distance of up to 7.5 cm (3"), or in some cases by more than 7.5 cm. Any of the horizontal displacements can, depending on the specific geometries of the articulating mechanisms 130, 132, can correspond to a seat bottom tilt of up to 5 degrees, preferably up to 6 degrees, more preferably up to 7 degrees. In some alternative embodiments, the seat bottom tilt can be more than 7 degrees.

In embodiments of the seat assembly 100 having an articulating seat back 104 that is mechanically linked with the seat bottom assembly 102, the range of seat back tilt that corresponds to any horizontal displacement of the seat bottom assembly depends on the geometry of the seat back, e.g., a length of the lower portion 122 of the seat back below the pivot point 124, and the length of the seat back above the pivot point. According to various embodiments, the seat back tilt associated with a full recline of the passenger seat assembly 100 can be up to 13.6 degrees and correspond to a 15 cm (6") displacement of a top end of the seat back 104. According to various embodiments, suitable maximum recline angles can be from about 5 degrees to about 20 degrees. In some alternative embodiments, (e.g., seating assemblies unconstrained by seat arrangement criteria, space concerns, and the like) the range of possible recline angles can be substantially unlimited. In some embodiments, the seat back 104 may not be mechanically linked to the articulating seat bottom assembly 102, in which case, a decoupled seat back may have any suitable range of motion, and may be controlled (i.e., locked or unlocked from motion) by a separate recline lock mechanism than that provided for locking the seat bottom assembly 102.

The seat bottom assembly 102 is able to move forward and aft by articulating via the forward and aft articulating mechanisms 130, 132 within a predefined range of movement, which can be constrained by a recline lock assembly 138. The recline lock assembly 138 can be an air piston, hydraulic piston, or other suitable linear locking mechanism that is connected with the frame 108 and with the seat bottom pan 112, with controls 144 that can allow or prevent the recline lock assembly from expanding and contracting. Suitable recline lock controls 144 are mountable at any suitable position on or adjacent the seat assembly 102, including, e.g., on a passenger armrest 106. Recline lock controls 144 may include a button, switch, lever, or other manual actuator that can release the recline lock assembly 138. The recline lock assembly 138 can be attached to the seat pan 112 at any suitable location and further attached at an opposite end to the seat frame 108. In some embodiments, the recline lock assembly 138 is attached near a midpoint of the seat pan 112 by a first attachment element 140; and is attached near a forward end of the seat frame 108 by a second attachment element 142. In embodiments having a seat back 104 that is decoupled from the articulating seat bottom assembly 102, a separate recline lock mechanism and separate recline lock controls can be provided for controlling the decoupled seat back.

FIG. 2A is a simplified side view schematic of the passenger seat 100 of FIG. 1 in an upright configuration 200a with a focus on the aft articulating mechanism 132, in accordance with an embodiment of the present disclosure. Note that only one side of the passenger seat 100 is shown, and similar structures can be positioned on an opposite side that mirror those described. The aft articulating mechanism 132 is mounted to the frame 108 near an aft end of seat bottom assembly 102, with the arcuate track 134 positioned alongside the seat bottom pan 112. The bearing element 128 may be a roller, pin, or low-friction bearing surface that can support the seat bottom assembly 102 with a passenger seated thereon whole moving within the arcuate track 134.

Figure 2B:
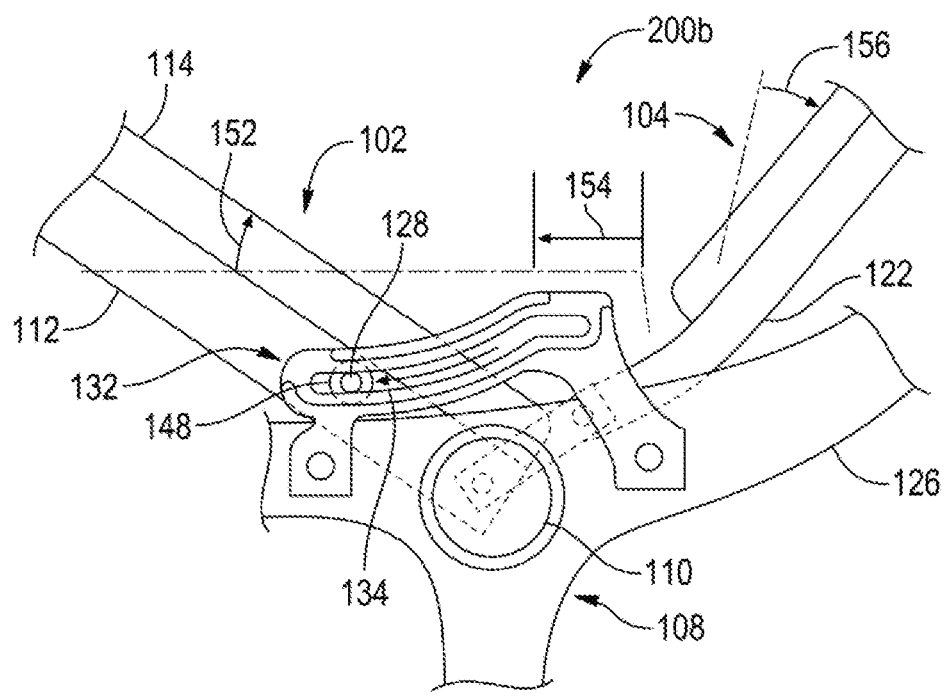

As shown in FIG. 2B, the seat bottom assembly 102 can transition between an upright configuration 200a and a reclined configuration 200b when the seat bottom assembly is moved forward, causing the bearing element 128 to move from a first, upright position 146, along a path defined by the arcuate track 134, to a second, reclined position 148. This movement corresponds to a drop in the aft portion of the seat bottom assembly 102 that, when combined with movement of the front portion, results in a change in seat bottom recline angle 152 that occurs in tandem with forward displacement 154.

Figure 3A:
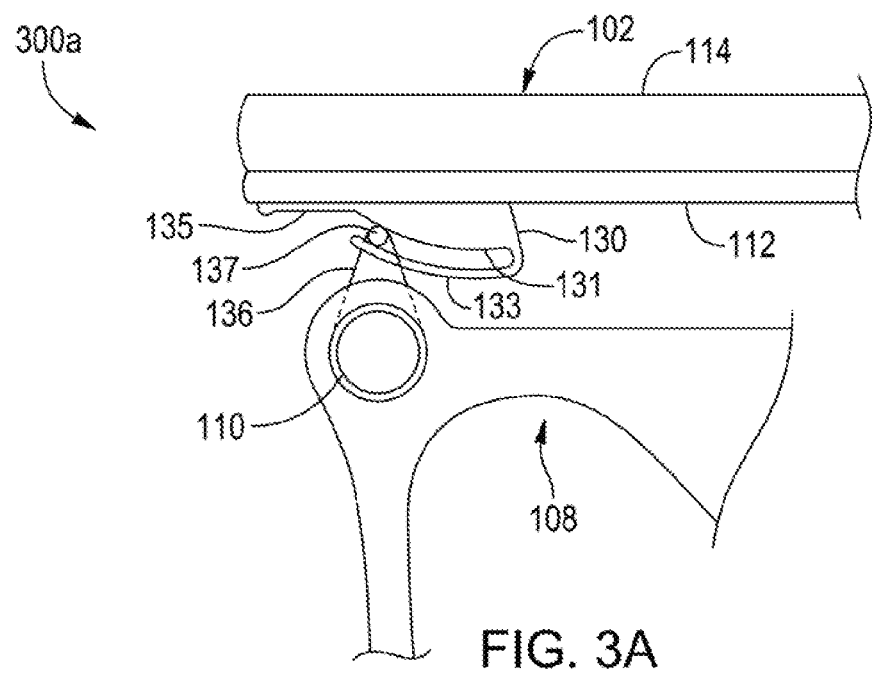
FIG. 3A and FIG. 3B are simplified side view schematics of the passenger seat of FIG. 1 with a focus on an example of a forward articulating assembly of the passenger seat.

FIG. 3A is a simplified side view schematic of the passenger seat 100 of FIG. 1 in an upright configuration 300a, with a focus on an example of a forward articulating mechanism 130 of the passenger seat, in accordance with an embodiment of the present disclosure. Again, note that only one side of the passenger seat 100 is shown, and similar structures may be positioned on an opposite side that mirror those described. The forward articulating mechanism 130 includes a ramp surface 131 connected with the seat bottom pan 112 of the seat bottom assembly 102. The ramp surface 131 is supported by a bearing surface 137 at an end of the forward bearing element 136, which is connected to the seat frame 108 near the forward end of the seat bottom assembly 102. When the seat bottom assembly 102 is in an upright configuration 300a, the forward bearing element 136 supports the ramp surface 131 near a forward end of the ramp surface. When the seat bottom assembly 102 is moved forward from the upright configuration to a reclined configuration, the ramp surface 131 slides over the bearing element 136, causing the bearing element to move upward due to the curvature of the ramp surface 131.

In various embodiments, the ramp surface 131 can have a convex shape that causes the forward end of the seat bottom assembly 102 to follow a curved path in an upward direction and with a negative curvature. However, a variety of other curvatures or shapes are possible for the ramp surface 131 that result in a variety of paths, e.g., a linear ramp, a ramp with a concave shape, or a ramp with a higher-order shape that can cause the forward end of the seat bottom assembly 102 follow a specific ergonomically-relevant path (e.g., from a cradling action toward a flattened configuration, or vice versa).

The forward articulating mechanisms 130 can also include a retainer 133 that partially encloses the forward bearing element 136 to prevent the forward end of the seat bottom assembly 102 from lifting off of the bearing element. In some embodiments, the forward bearing element 136 includes a T-shaped portion at the bearing surface 137 that is prevented from moving away from the ramp surface 131 by the retainer 133. The retainer 133 can further include a slotted construction that captures the forward bearing element 136 from two sides, thus preventing liftoff and lateral movement of the ramp surface 131 with respect to the forward bearing element.

Figure 3B:
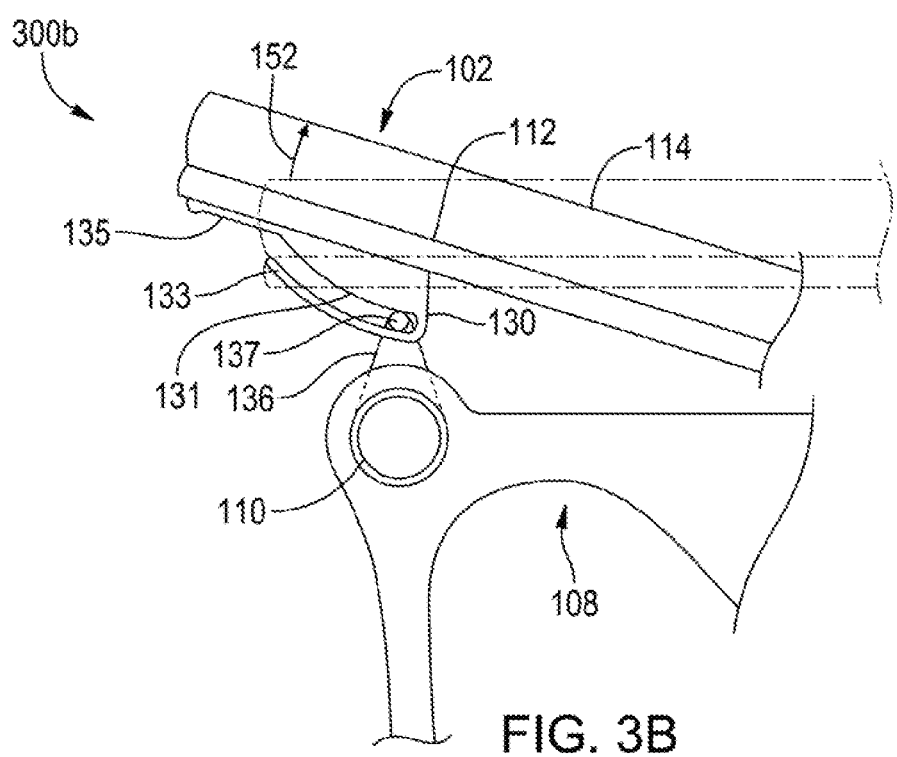

As shown in FIG. 3B, the seat bottom assembly 102 can transition between an upright configuration 300a and a reclined configuration 300b when the seat bottom assembly is moved forward, causing the ramp surface 131 to track a curved path defined by shape of the ramp surface. This movement corresponds to a rise in the forward portion of the seat bottom assembly 102 that, when combined with movement of the aft portion described above, results in a change in seat bottom recline angle 152 that occurs in tandem with forward displacement 154.

Figure 4A:
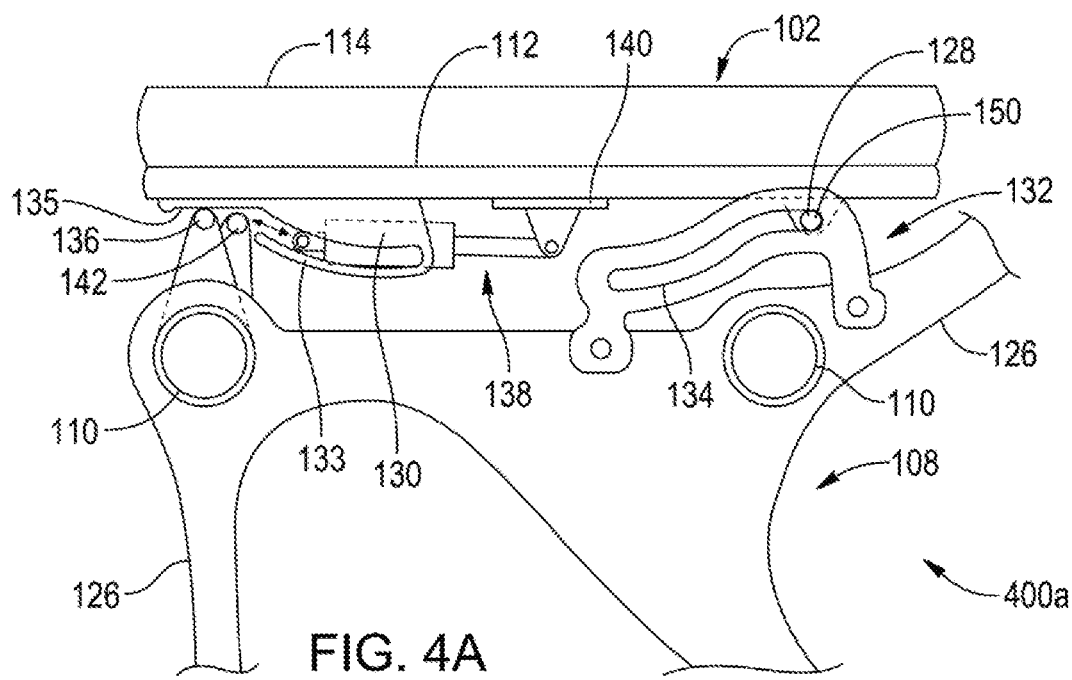
FIG. 4A and FIG. 4B are simplified side view schematics of the passenger seat of FIG. 1 illustrating an installation position and connection of a recline lock mechanism.

FIG. 4A is a simplified side view schematic of the passenger seat of FIG. 1, in an released configuration 400a, illustrating an installation position 150 and connection of a recline lock mechanism 138, in accordance with various embodiments of the present disclosure. When the seat bottom assembly 102 is fully engaged with the aft articulating mechanism 132 and forward articulating mechanism 130, the seat bottom assembly is able to move horizontally within a range of movement constrained by the range of the recline lock mechanism 138, which connects to the seat bottom pan 112 and to the frame 108 at a recline lock connection element 142, and which can extend or contract by a predefined distance when released by a user.

With the recline lock mechanism 138 disconnected from either the frame 108 or the seat bottom pan 112, the seat bottom assembly 102 can be freely moved horizontally beyond an extent normally permitted by the range of the recline lock mechanism. In an embodiment, the seat bottom assembly 102 can be moved horizontally aft beyond the upright configuration to an install configuration 150, by which the aft articulating mechanism 132 accommodates movement to a rearmost extent of the arcuate track 134.

Figure 4B:
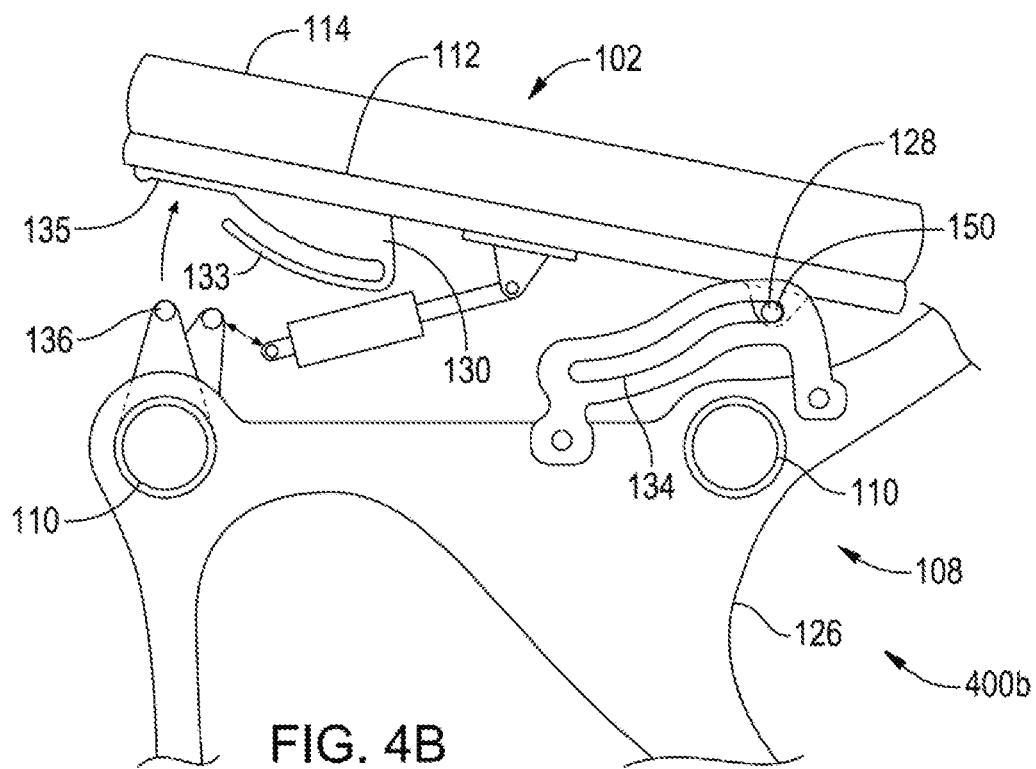

As shown in FIG. 4B, the install configuration 150 permits the seat bottom assembly 102 to be lifted from the released configuration 400a, by pivoting the forward end of the seat bottom assembly off of the forward bearing element 136, to an access configuration 400b. The access configuration 400b can provide for installer access to under-seat components, such as the recline lock mechanism 138.

The installation position 150 can be used for installation of the seat bottom assembly 102 to the passenger seat frame 108. With the seat bottom assembly 102 pushed aft of the ordinary range of movement, and with the aft bearing element 128 in the installation position 150, the forward articulating mechanism 130 is positioned to receive the forward bearing element 136 through an opening 135 in the retainer 133. With the forward bearing element 136 in contact with the forward ramp surface 131, the seat bottom assembly 102 can be moved forward until the bearing element 136 is constrained by the retainer 133 and the recline lock mechanism 138 is positioned for attachment to both the attachment element 142 and the seat bottom pan 112. In an installation procedure, the recline lock mechanism 138 may be preassembled with either the passenger seat frame 108 or with the seat bottom pan 112 prior to assembly of the seat bottom assembly 102 with the seat frame.

Figure 5:
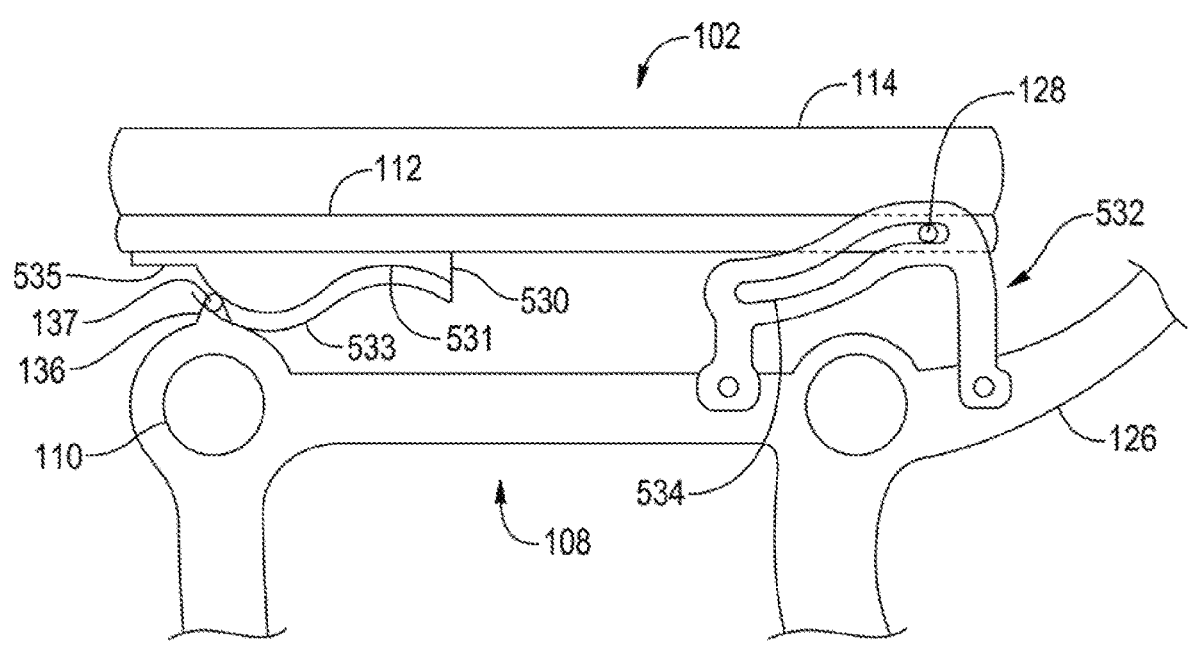
FIG. 5 is a simplified side view schematic of the passenger seat of FIG. 1 with an alternative set of aft and forward articulating assemblies configured for an extended range of motion, in accordance with various embodiments.

FIG. 5 is a simplified side view schematic of the passenger seat of FIG. 1 with an alternative set of elongated aft and forward articulating assemblies 532, 530 configured for an extended range of motion, in accordance with various embodiments. In accordance with an embodiment, the elongated forward articulating mechanism 530 can define any suitable path for constraining vertical movement of the forward end of the seat bottom assembly 102 when the seat bottom assembly is moved horizontally. Similarly, the elongated aft articulating mechanism 532 can defined any suitable path for constraining vertical movement of the aft end of the seat bottom assembly 102 in response to horizontal movement. In specific embodiments, the elongated forward articulating mechanism 530 can include an elongated ramp surface 531 that crosses an inflection point, causing the forward end of the seat bottom assembly 102 to move first upward, and then downward, in response to forward motion. The elongated forward articulating assembly 530 can include a comparably elongated retainer 533 for constraining movement of the seat bottom assembly.

Similarly, the elongated aft articulating mechanism 532 can include an elongated track 534 that may cross an inflection point and allow the aft portion of the seat bottom assembly 102 to first drop, and then rise, in response to forward motion. In combination, elongated forward and aft articulating assemblies in a variety of specific configurations can be used to control the tilt of the seat bottom assembly 102 over its horizontal displacement in order to achieve ergonomic postures for a seated passenger throughout various reclined positions. For example, in a partially reclined posture, a tilted seat bottom assembly 102 can help to prevent the sensation of sliding out of the seat, and improve comfort. In an extended or fully reclined posture, a high degree of tilt of the seat bottom assembly may become uncomfortable.

Figure 6A:
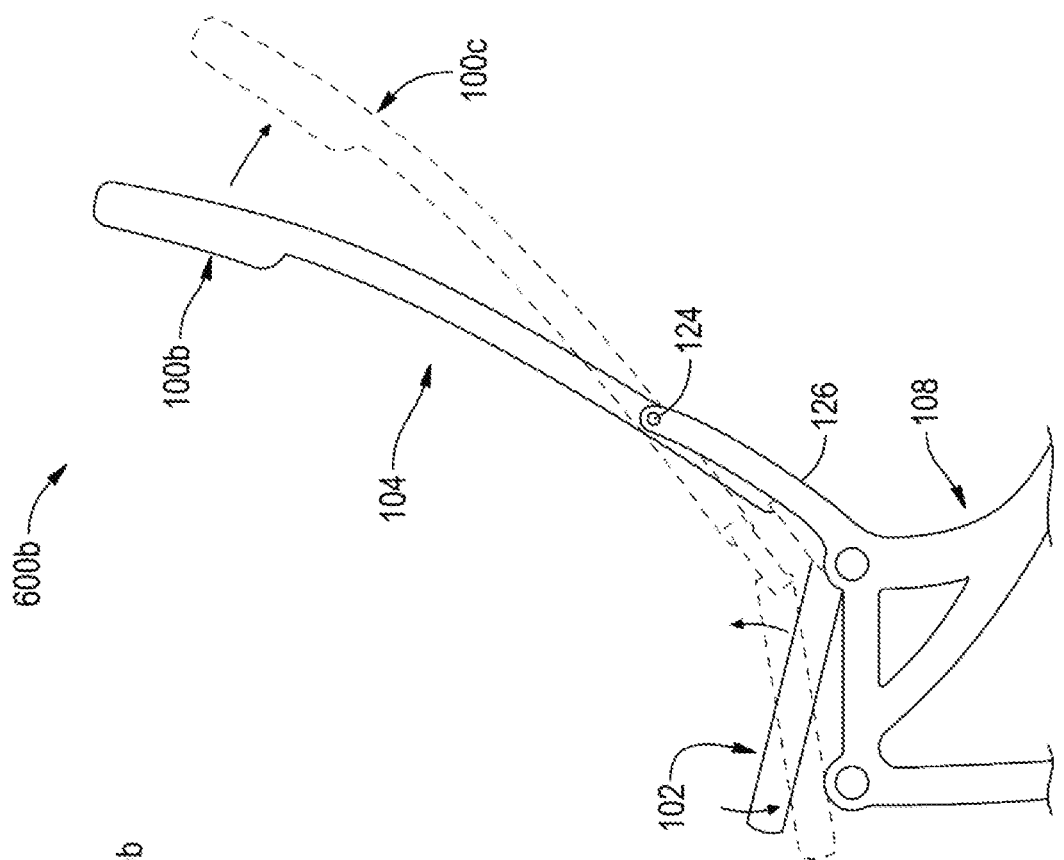
FIG. 6A and FIG. 6B are simplified side view schematics of the passenger seat of FIG. 5 illustrating an extended recline motion.

FIG. 6A is a simplified side view schematic of the passenger seat of FIG. 5 illustrating a first recline transition 600a, in accordance with various embodiments. In the first recline transition 600a, the seat bottom assembly 102 is tilted aft as the seat bottom assembly moves forward, and the seat back 104 moves aft from a first, upright position 100a to a second, reclined position 100b. This transition corresponds generally to the recline movements described with reference to FIGS. 1-3.

Figure 6B:
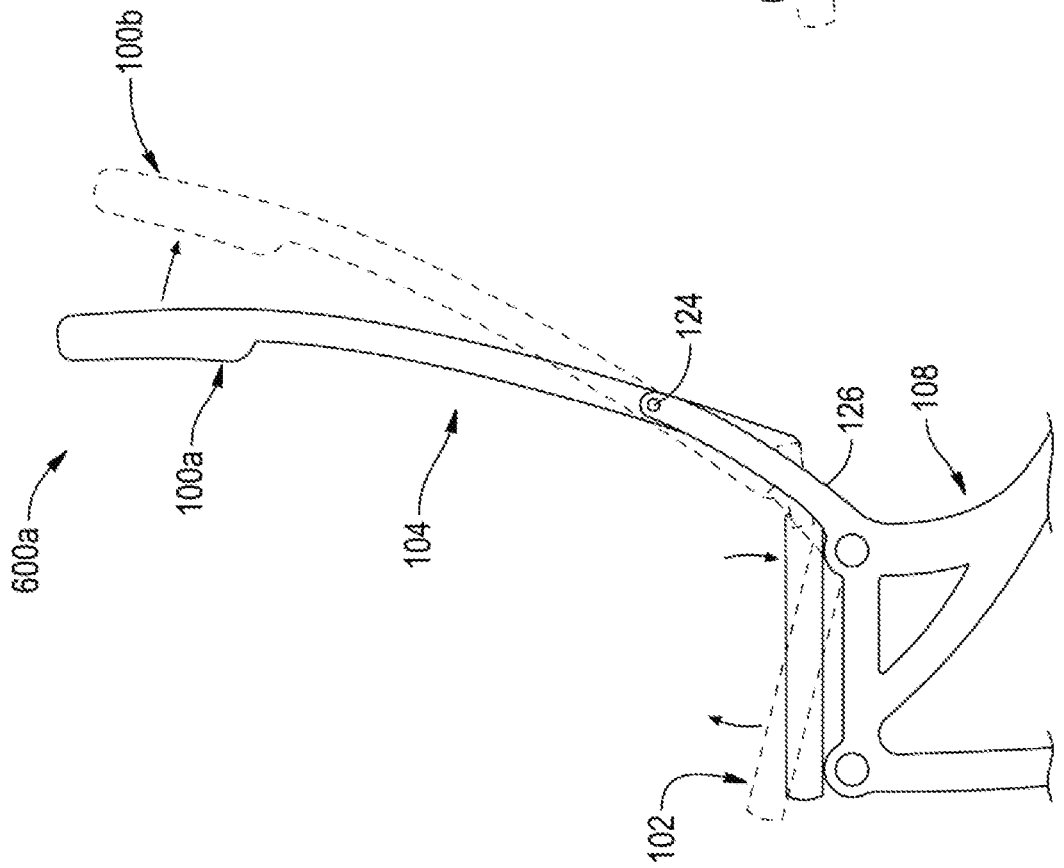

FIG. 6B illustrates a second recline transition 600b, which can occur after the first recline transition 600a, and in which the seat bottom assembly 102 can again change in tilt as the seat bottom assembly is moved farther forward, and as the seat back 104 moves farther aft from the reclined position 100b to a third, extended reclined position 100c. A variety of specific configurations of the seat bottom assembly 102 can accompany an extended recline, and a reversed tilt is shown for illustrative purposes only. In some embodiments, as the seat bottom assembly 102 moves in a forward direction from the reclined position 100b to an extended recline position 100c, the seat bottom assembly may increase in tilt, may flatten, may decrease in tilt, or may remain at a consistent degree of tilt throughout the transition.

Figure 7:
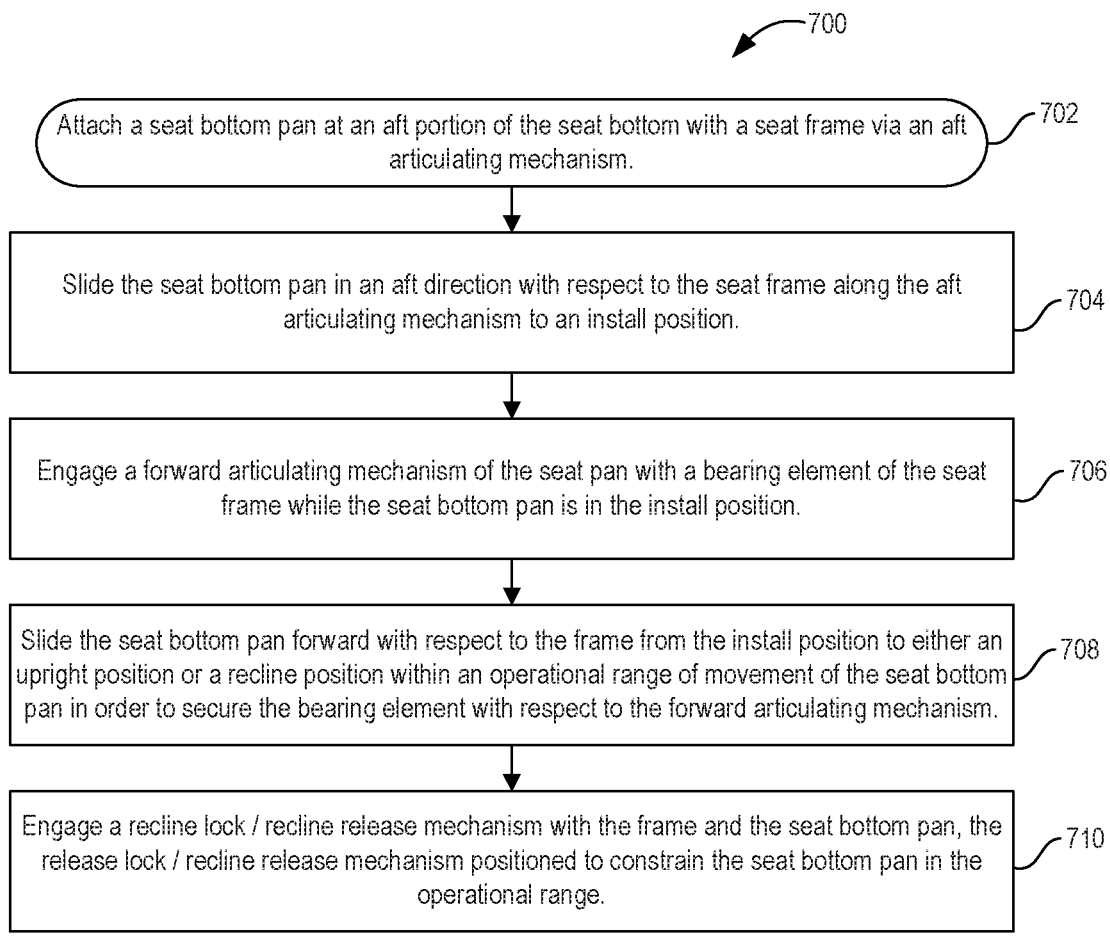
FIG. 7 illustrates an example process for installing an articulating seat bottom assembly to a frame of a passenger seat.

FIGS. 7 and 8 illustrate examples of processes 700 and 800 for the installation of articulating seat bottom assemblies and for the articulation of said assemblies once installed. Processes 700 and 800 (or any other processes described herein, or variations, and/or combinations thereof) may be automated and performed mechanically under the control of one or more computer systems configured with executable instructions and implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, aspects of processes 700 and 800 may be performed manually.

FIG. 7 illustrates an example process 700 for installing an articulating seat bottom assembly to a frame of an articulating passenger seat illustrated according to any of FIGS. 1-6. In accordance with various embodiments, a seat bottom assembly can be operably connected with a passenger seat frame by attaching the seat bottom pan, at an aft portion of the seat bottom pan, with a seat frame via an aft articulating mechanism. (Act 702) This attachment can take the form of installing rollers, pins, or other suitable bearing elements to the seat bottom pan through an arcuate slot the aft articulating mechanism, or otherwise attaching a preassembled aft articulating mechanism, connected with the seat bottom, to the frame by any suitable connector, weld, adhesive, or other connective element. In some alternative embodiments, the aft articulating mechanism can include an arcuate track connected to the seat bottom pan, which can be operably connected with the passenger seat frame by installing suitable rollers, pins, or other bearing elements through the arcuate track and directly to the seat frame. In either set of embodiments, the partially installed seat bottom assembly can slide forward and aft along the arcuate track and can pivot to open space beneath the seat bottom assembly.

The seat bottom pan can be moved aft with respect to the seat frame along the aft articulating mechanism to an install position. (Act 704) In the install position, a recline lock mechanism connected with the seat bottom pan is accessible and does not obstruct access to a recline lock mechanism attachment element, typically located forward of the recline lock mechanism and mounted to the seat frame. In the install position, the seat bottom pan can be pivoted downward to engage a forward articulating mechanism of the seat pan with a bearing element of the seat frame while the seat bottom pan. (Act 706) The forward articulating mechanism may engage by passing the bearing element through an opening in a retainer or shroud that encloses a remainder of the forward articulating mechanism.

Once the forward articulating mechanism and bearing element are engaged, the seat bottom pan can be moved forward with respect to the frame from the install position to either an upright position or a recline position within an operational range of movement of the seat bottom pan in order to secure the bearing element with respect to the forward articulating mechanism. (Act 708) When the seat bottom pan is within this operational range of movement, the recline lock or recline release mechanism can be connected with the frame and the seat bottom pan. (Act 710) The release lock mechanism can act as a mechanical constraint for keeping the seat bottom pan in the operational range, and may provide other technical benefits, such as energy absorption, spring-loading for seat return, and other uses.

FIG. 8 illustrates an example process 800 for reclining or reverting an articulating passenger seat illustrated according to any of FIGS. 1-6. In accordance with embodiments, a recline lock mechanism can be released to permit adjustment of a seat bottom pan and/or seat back. (Act 802)

Once unlocked, the seat bottom can be articulated in a forward direction by the exertion of force on the seat bottom such that the seat bottom slides forward from a first, upright position to a second, reclined position. During this movement, the aft portion of the seat bottom slides downward and forward along a first path, and the forward portion of the seat bottom slides upward and forward along a second path. (Act 804) Once positioned as desired, the articulating seat bottom can be locked in place by engagement (or re-engagement) of the recline lock mechanism to secure the seat bottom pan and/or seat back at the reclined position. (Act 806)

In some embodiments, the seat bottom assembly can be further actuated to an extended recline position by the release of the recline lock mechanism and further movement by sliding the seat bottom forward from the second, reclined position to a third, extended recline position. In moving the seat bottom assembly to an extended recline position, the aft portion of the seat bottom may slide upward and forward along the first path and the forward portion of the seat bottom can sliding farther forward, optionally upward or downward along the second path, depending on the specific geometry of the selected forward articulating mechanism. (Act 808) The selection of the geometries of aft and forward articulating mechanisms can be used to tailor the specific tilt of the seat bottom assembly at different positions along a forward-aft axis, as discussed above with reference to FIGS. 5-6.

The return of the seat bottom assembly (and the seat assembly) to an upright and secured position can be achieved by releasing the recline lock mechanism and actuating the seat bottom in an aft direction by exerting force in the aft direction on the seat bottom such that the seat bottom slides in reverse. This actuation can occur from either one of the second or third positions toward the first position, or from any intervening position, the aft portion of the seat bottom sliding in reverse along the first path and the forward portion of the seat bottom sliding in reverse along the second path. (Act 810) Securement of the seat bottom assembly (and the seat assembly) can be achieved by engaging the recline lock mechanism when the seat bottom pan is positioned in the upright position to secure the seat bottom pan and/or seat back at the upright position. (Act 812)

In the following, further examples are described to facilitate the understanding of the invention:

Example A. A passenger seat, comprising:

a seat frame; and a seat bottom slidingly and pivotally attached to the seat frame, and configured to articulate forward from a first seat position corresponding to an upright configuration of the passenger seat to a second seat position corresponding to a reclined configuration of the passenger seat when the passenger seat is reclined by a user;

an aft articulating mechanism connected with the seat bottom near an aft end of the seat bottom and connected with seat frame, the aft articulating mechanism defining a first path that declines in an aft-to-forward direction to cause the aft end of the seat bottom to drop by a first distance when the seat bottom articulates forward; and a forward articulating mechanism connected with the seat bottom near a forward end of the seat bottom and connected with the seat frame, the forward articulating mechanism defining a second path shaped to cause the forward end of the seat bottom to move upward by a second distance when the seat bottom articulates forward, the second distance being different from the first distance, such that the seat bottom tilts aft in response to articulating forward when the passenger seat is reclined.

Example B. The passenger seat of example A, wherein the first distance is greater than the second distance.

Example C. The passenger seat of example A or example B, wherein one or both of the first and second paths are arcuate.

Example D. The passenger seat of any of the preceding examples, wherein the first path has a negative curvature.

Example E. The passenger seat of any of the preceding examples, wherein the second path has a positive curvature Example F. The passenger seat of any of the preceding examples, wherein the second path comprises a minimum such that the forward end of the seat bottom moves first upward and then downward as the seat bottom articulates from the first seat position to the second seat position.

Example G. The passenger seat of any one of the preceding examples, wherein the aft articulating mechanism comprises:

a first track connected with one of the seat bottom or the seat frame, the first track defining the first path; and a roller connected with the other of the seat bottom or the seat frame and configured to engage with the first track such that, when the first track and roller are engaged, the first track and roller constrain the aft end of the seat bottom such that the aft end of the seat bottom drops according to the first path when the seat bottom articulates forward Example H. The passenger seat of any one of the preceding examples, wherein the forward articulating mechanism comprises:

a second track connected with one of the seat bottom or the seat frame, the second track defining the second path; and a bearing element connected with the other of the seat bottom or the seat frame and configured to engage with the second track such that, when the second track and bearing element are engaged, the second track and bearing element constrain the forward end of the seat bottom such that the forward end of the seat bottom moves according to the second path when the seat bottom articulates forward.

Example I. The passenger seat of example 8, wherein:

the second track comprises a curved ramp connected to the seat bottom;

the bearing element comprises a T-shaped bearing connected to the frame and configured to engage the curved ramp Example J. The passenger seat of any of the preceding examples, wherein:

the aft articulating mechanism comprises:

a first location associated with the upright configuration of the passenger seat;

a second location forward of the first location, the second location associated with the reclined configuration of the passenger seat, the second location being lower than the first location; and a third location associated with an install configuration of the passenger seat, the third location being aft of the first and second locations, and the install configuration corresponding to the seat bottom being articulated aft beyond the first seat position; and the forward articulating mechanism comprises a retention element positioned to retain the forward end of the seat bottom when the passenger seat is in the upright configuration or the reclined configuration, and configured to release the seat bottom when the passenger seat is in the install configuration.

Example K. The passenger seat of any of the preceding examples, further comprising:

a recline lock mechanism connected at a first end with the seat bottom near the forward end of the seat bottom and connected at a second end with the frame, the recline lock mechanism being actuatable by the user between an unlocked configuration and a locked configuration, wherein:

in the unlocked configuration, the recline lock mechanism can extend to allow the seat bottom to move between the first seat position and the second seat position; and in the locked configuration, the recline lock mechanism prevents relative motion of the seat bottom with respect to the frame.

Example L. The passenger seat of any of the preceding examples, further comprising:

a reclinable seat back pivotally connected with the frame and mechanically connected, at a bottom end of the reclinable seat back, with the seat bottom such that, when the seat bottom articulates forward, the reclinable seat back tilts aft.

Example M. The passenger seat of example L, wherein the reclinable seat back tilts aft by up to 20 degrees in response to the seat bottom articulating forward from the first seat position to the second seat position.

Example N. The passenger seat of any of the preceding examples, wherein:

a horizontal travel of the seat bottom defined by a difference between the second position in the first position is in the range of 3.8 cm to 7.6 cm; and a rearward tilt of the seat bottom corresponding to the difference between the second seat position and the first seat position is in the range of 2 degrees to 9 degrees, preferably from 5 degrees to 7 degrees.

Example O. The passenger seat of any of the preceding examples, wherein:

the seat bottom is configured to articulate forward beyond the second seat position to an extended recline position whereby the seat bottom tilts forward; and the second path defined by the forward articulating mechanism is shaped to cause the forward end of the seat bottom to revert downward in response to the seat bottom articulating forward when the passenger seat is reclined from the reclined configuration to the extended recline position Example P. A method of adjusting a seat bottom angle, the method comprising:

with a seat comprising:

a seat frame;

a seat bottom slidingly and pivotally attached to the seat frame by an aft articulating mechanism and a forward articulating mechanism;

the aft articulating mechanism connected with the seat bottom near an aft end of the seat bottom and defining a first path that declines in an aft-to-forward direction; and the forward articulating mechanism connected with the seat bottom near a forward end of the seat bottom and defining a second path shaped to cause the forward end of the seat bottom to move upward by a second distance when the seat bottom articulates forward, the second distance being different from the first distance; and a release mechanism operably connected with the seat bottom and with the frame;

actuating the release mechanism to free the seat bottom to move with respect to the frame;

actuating the seat bottom by exerting force in a forward direction on the seat bottom such that the seat bottom slides forward from a first seat position to a second seat position, the aft end of the seat bottom slides downward and forward along the first path, and the forward end of the seat bottom slides upward and forward along the second path; and disengaging the release mechanism to lock the seat bottom in the second seat position.

Example Q. The method of example P, wherein:

the seat further comprises a reclinable seat back connected, via a linkage, at a bottom end of the reclinable seat back with the seat bottom; and actuating the seat bottom such that the seat bottom slides forward causes the reclinable seat back to tilt aft by the seat bottom pulling the bottom end of the reclinable seat back forward.

Example R. The method of example P, further comprising:

with the seat bottom connected to the seat frame by the aft articulating mechanism and disconnected from the seat frame by the forward articulating mechanism, moving the seat bottom aft to an install seat position whereby the forward articulating mechanism is receptive to engagement;

engaging the forward articulating mechanism such that the seat bottom is connected with the seat frame by the forward articulating mechanism;

moving the seat bottom forward to the first seat position whereby the forward articulating mechanism constrains the seat bottom with respect to the seat frame; and connecting the release mechanism with the seat frame and the seat bottom such that the seat bottom is prevented by the release mechanism from returning to the install position from the first position.

Example S. An articulating seat bottom assembly for a passenger seat, the assembly comprising:

a seat bottom;

an aft articulating mechanism connected with an aft end of the seat bottom and configured to attach to a passenger seat frame, the aft articulating mechanism comprising a first path that declines in an aft-to-forward direction and that, when attached to the seat bottom and the passenger seat frame, is shaped to constrain motion of the aft end of the seat bottom with respect to the passenger seat frame such that the aft end of the seat bottom moves down by a first distance when the seat bottom is pushed forward from a first seat position to a second seat position;

a forward articulating mechanism connected with a forward end of the seat bottom and configured to attach to a passenger seat frame, the forward articulating mechanism comprising a second path shaped to cause the forward end of the seat bottom to move upward by a second distance when the seat bottom articulates forward, the second distance being different from the first distance, such that the seat bottom tilts aft in response to articulating forward when the seat bottom is connected with the passenger seat and the passenger seat is reclined.

Example T. The articulating seat bottom assembly of example 19, wherein:

the aft articulating mechanism comprises an arcuate track configured to connect with the seat frame and a roller connected with the seat bottom and configured to engage with the arcuate track to constrain movement of the aft end of the seat bottom according to the first path when the seat bottom is connected with the passenger seat frame; and the forward articulating mechanism comprises an arcuate ramp connected with the seat bottom and configured to engage with a bearing surface of the passenger seat frame when the seat bottom is connected with the passenger seat frame, the aft articulating mechanism and forward articulating mechanism operable, together, to cause the seat bottom to tilt aft in response to being pushed forward when the seat bottom is connected with the passenger seat frame.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method of adjusting a seat bottom angle, the method comprising: with a seat comprising:
    a seat frame;
    a seat bottom slidingly and pivotally attached to the seat frame by an aft articulating mechanism and a forward articulating mechanism;
        the aft articulating mechanism connected with the seat bottom near an aft end of the seat bottom and defining a first path that declines in an aft-to-forward direction to cause the aft end of the seat bottom to move downward by a first distance when the seat bottom is moved forward; and
        the forward articulating mechanism connected with the seat bottom near a forward end of the seat bottom and defining a second path shaped to cause the forward end of the seat bottom to move upward by a second distance when the seat bottom is moved forward, the second distance being different from the first distance; and
    a release mechanism operably connected with the seat bottom and with the seat frame;
        with the seat bottom connected to the seat frame by the aft articulating mechanism and disconnected from the seat frame by the forward articulating mechanism, moving the seat bottom forward of a second seat position or aft of a first seat position to an install seat position whereby the forward articulating mechanism is receptive to engagement
    engaging the forward articulating mechanism such that the seat bottom is connected with the seat frame by the forward articulating mechanism;
    moving the seat bottom forward to the first seat position whereby the forward articulating mechanism constrains the seat bottom with respect to the seat frame;
    connecting the release mechanism with the seat frame and the seat bottom such that the seat bottom is prevented by the release mechanism from returning to the install seat position from the first seat position;
    actuating the release mechanism to free the seat bottom to move with respect to the seat frame;
    moving the seat bottom forward from the first seat position to the second seat position such that the aft end of the seat bottom slides downward and forward along the first path, and the forward end of the seat bottom slides upward and forward along the second path, causing the seat bottom to tilt aft in the second seat position; and
    disengaging the release mechanism to lock the seat bottom in the second seat position.

2. The method of claim 1, wherein:
    the seat further comprises a reclinable seat back connected, via a linkage, at a bottom end of the reclinable seat back with the seat bottom; and
    moving the seat bottom forward causes the reclinable seat back to tilt aft by the seat bottom pulling the bottom end of the reclinable seat back forward.

3. The method of claim 2, wherein moving the seat bottom forward from the first seat position to the second seat position causes the reclinable seat back to tilt aft by 5-20 degrees.

4. An articulating seat bottom assembly for a passenger seat, the assembly comprising:
    a seat bottom;
    an aft articulating mechanism connected with an aft end of the seat bottom and configured to attach to a passenger seat frame, the aft articulating mechanism comprising a first path that declines in an aft-to-forward direction and that, when attached to the seat bottom and the passenger seat frame, is shaped to constrain motion of the aft end of the seat bottom with respect to the passenger seat frame such that the aft end of the seat bottom moves down by a first distance when the seat bottom is pushed forward from a first seat position to a second seat position;
    a forward articulating mechanism connected with a forward end of the seat bottom and configured to attach to the passenger seat frame, the forward articulating mechanism comprising a second path shaped to cause the forward end of the seat bottom to move upward by a second distance when the seat bottom articulates forward, the second distance being different from the first distance, such that the seat bottom tilts aft in response to articulating forward when the seat bottom is connected with the passenger seat and the passenger seat is reclined; and
    a release mechanism operably connectable with the seat bottom and with the passenger seat frame, the release mechanism actuatable to free the seat bottom to move with respect to the passenger seat frame from the first seat position to the second seat position, the release mechanism disengageable to lock the seat bottom in the second seat position, wherein:

the aft articulating mechanism comprises an arcuate track configured to connect with the passenger seat frame and a roller connected with the seat bottom and configured to engage with the arcuate track to constrain movement of the aft end of the seat bottom according to the first path when the seat bottom is connected with the passenger seat frame; and the forward articulating mechanism comprises an arcuate ramp connected with the seat bottom and configured to engage with a bearing element connected to the passenger seat frame when the seat bottom is connected with the passenger seat frame, the aft articulating mechanism and forward articulating mechanism operable, together, to cause the seat bottom to tilt aft in response to being pushed forward when the seat bottom is connected with the passenger seat frame.

5. The articulating seat bottom assembly of claim 4, wherein the first distance is greater than the second distance.

6. The articulating seat bottom assembly of claim 4, wherein one or both of the first and second paths are arcuate.

7. The articulating seat bottom assembly of claim 4, wherein the first path has a negative curvature.

8. The articulating seat bottom assembly of claim 4, wherein the second path has a positive curvature.

9. The articulating seat bottom assembly of claim 4, wherein the second path comprises a minimum such that the forward end of the seat bottom moves first upward and then downward as the seat bottom articulates from the first seat position to the second seat position.

10. The articulating seat bottom assembly of claim 4, wherein:

the aft articulating mechanism comprises:
 a first location associated with an upright configuration of the passenger seat;
 a second location forward of the first location, the second location associated with a reclined configuration of the passenger seat, the second location being lower than the first location; and
 a third location associated with an install configuration of the passenger seat, the third location being aft of the first location or forward of the second location, and the install configuration corresponding to the seat bottom being articulated aft beyond the first seat position or forward beyond the second seat position; and the forward articulating mechanism comprises a retention element positioned to retain the forward end of the seat bottom when the passenger seat is in the upright configuration or the reclined configuration, and configured to release the seat bottom when the passenger seat is in the install configuration.

11. The articulating seat bottom assembly of claim 4, further comprising:

a recline lock mechanism connected at a first end with the seat bottom near the forward end of the seat bottom and connected at a second end with the passenger seat frame, the recline lock mechanism being actuatable by a user between an unlocked configuration and a locked configuration, wherein:
 in the unlocked configuration, the recline lock mechanism can extend to allow the seat bottom to move between the first seat position and the second seat position; and
 in the locked configuration, the recline lock mechanism prevents relative motion of the seat bottom with respect to the passenger seat frame.

12. The articulating seat bottom assembly of claim 4, further comprising:

a reclinable seat back pivotally connected with the passenger seat frame and mechanically connected, at a bottom end of the reclinable seat back, with the seat bottom such that, when the seat bottom articulates forward, the reclinable seat back tilts aft.

13. The articulating seat bottom assembly of claim 4, wherein:

the seat bottom is configured to articulate forward beyond the second seat position to an extended recline position whereby the seat bottom tilts forward; and the second path defined by the forward articulating mechanism is shaped to cause the forward end of the seat bottom to revert downward in response to the seat bottom moving forward when the passenger seat is reclined from the second seat position to the extended recline position.

14. A passenger seat, comprising:

a seat frame; and a seat bottom slidingly and pivotally attached to the seat frame, and configured to articulate forward from a first seat position corresponding to an upright configuration of the passenger seat to a second seat position corresponding to a reclined configuration of the passenger seat when the passenger seat is reclined by a user, wherein the seat bottom is configured to articulate forward beyond the second seat position to an extended recline position whereby the seat bottom tilts forward;

an aft articulating mechanism connected with the seat bottom near an aft end of the seat bottom and connected with seat frame, the aft articulating mechanism defining a first path that declines in an aft-to-forward direction to cause the aft end of the seat bottom to drop by a first distance when the seat bottom articulates forward;

a forward articulating mechanism connected with the seat bottom near a forward end of the seat bottom and connected with the seat frame, the forward articulating mechanism defining a second path shaped to cause the forward end of the seat bottom to move upward by a second distance when the seat bottom articulates forward, the second distance being different from the first distance, such that the seat bottom tilts aft in response to articulating forward when the passenger seat is reclined, wherein the second path defined by the forward articulating mechanism is shaped to cause the forward end of the seat bottom to revert downward in response to the seat bottom moving forward when the passenger seat is reclined from the second seat position to the extended recline position; and a release mechanism operably connected with the seat bottom and with the seat frame, the release mechanism actuatable to free the seat bottom to move with respect to the seat frame from the first seat position to the second seat position, the release mechanism disengageable to lock the seat bottom in the second seat position.

15. The passenger seat of claim 14, wherein:

a horizontal displacement of the seat bottom between the second seat position and the first seat position is from 3.8 cm to 7.6 cm; and a rearward tilt of the seat bottom corresponding to a difference between the second seat position and the first seat position is from 2 degrees to 9 degrees.

16. The passenger seat of claim 14, wherein the aft articulating mechanism comprises:

a first track connected with one of the seat bottom or the seat frame, the first track defining the first path; and a roller connected with the other of the seat bottom or the seat frame and configured to engage with the first track such that, when the first track and roller are engaged, the first track and roller constrain the aft end of the seat bottom such that the aft end of the seat bottom moves downward according to the first path when the seat bottom articulates forward.

17. The passenger seat of claim 14, wherein the forward articulating mechanism comprises:
   a second track connected with one of the seat bottom or the seat frame, the second track defining the second path; and
   a bearing element connected with the other of the seat bottom or the seat frame and configured to engage with the second track such that, when the second track and bearing element are engaged, the second track and bearing element constrain the forward end of the seat bottom such that the forward end of the seat bottom moves according to the second path when the seat bottom articulates forward.

18. The passenger seat of claim 17, wherein:
   the second track comprises a curved ramp connected to the seat bottom; and
   the bearing element comprises a T-shaped bearing connected to the seat frame and configured to engage the curved ramp.

* * * * *